United States Patent
Kaneko et al.

(10) Patent No.: US 6,300,459 B1
(45) Date of Patent: Oct. 9, 2001

(54) PROCESS FOR PRODUCING AROMATIC POLYCARBONATE

(75) Inventors: Hiroaki Kaneko; Wataru Funakoshi; Katsushi Sasaki, all of Yamaguchi (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/403,862

(22) PCT Filed: Mar. 16, 1999

(86) PCT No.: PCT/JP99/01291

§ 371 Date: Oct. 28, 1999

§ 102(e) Date: Oct. 28, 1999

(87) PCT Pub. No.: WO99/47580

PCT Pub. Date: Sep. 23, 1999

(30) Foreign Application Priority Data

Mar. 17, 1998 (JP) .................................................. 10-066838

(51) Int. Cl.⁷ .................................................. C08G 64/00
(52) U.S. Cl. ........................................... 528/196; 528/198
(58) Field of Search ..................................... 528/196, 198

(56) References Cited

U.S. PATENT DOCUMENTS

| 4,323,668 | 4/1982 | Brunelle | 528/173 |
| 5,521,275 | 5/1996 | McCloskey | 528/196 |

FOREIGN PATENT DOCUMENTS

| 595 608 | 5/1994 | (EP) . |
| 10-36497 | 2/1998 | (JP) . |
| 10036497 | 2/1998 | (JP) . |

| 10-306158 | 11/1998 | (JP) . |

*Primary Examiner*—Terressa M. Boykin
(74) *Attorney, Agent, or Firm*—Sughrue, Mion, Zinn, Macpeak & Seas, PLLC

(57) ABSTRACT

An aromatic polycarbonate and an active-hydrogen compound are subjected to the transesterification reaction in the presence of a transesterification catalyst under a reduced pressure condition followed by reaction with a salicylic acid ester derivative expressed by the following chemical formula (1),

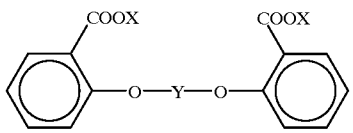

(1)

{wherein X is methyl or ethyl, and Y is a carbonyl group or a divalent functional group expressed by the following formula (2),

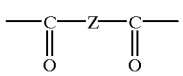

(2)

(where Z is an alkylene group having a carbon number of 1 to 30, an arylene group having a carbon number of 6 to 30 or an aralkylene group having a carbon number of 7 to 30)}.

An aromatic polycarbonate having a high molecular weight can be produced by this process.

5 Claims, No Drawings

PROCESS FOR PRODUCING AROMATIC POLYCARBONATE

TECHNICAL FIELD

The present invention relates to a process for the production of an aromatic polycarbonate having high molecular weight, more particularly, to a process for the production of an aromatic polycarbonate having high molecular weight, by increasing the terminal hydroxyl group content of an aromatic polycarbonate followed by application of a salicylic acid ester derivative having a specific structure as a condensation agent. The present invention is effectively utilizable especially for the recycling of an aromatic polycarbonate.

BACKGROUND TECHNOLOGY

Polycarbonate is widely used owing to its excellent mechanical characteristics such as impact resistance as well as high heat-resistance, transparency, etc. Aromatic polycarbonate has recently been used for recording materials such as optical disks and the demand has been increasing sharply.

Known methods for the production of such polycarbonate include the direct reaction of an aromatic diol such as bisphenol A with phosgene (the interfacial polymerization method) and the transesterification reaction of an aromatic diol with a diaryl carbonate such as diphenyl carbonate (the melt method).

Regarding polycarbonate produced by the above methods, U.S. Pat. No. 5,521,275 discloses a process for converting the molecular weight of an aromatic polycarbonate in the presence of a catalyst using an extruder with a polymer seal section and a venting section under a reduced pressure, and European Patent No. 0,595,608 discloses a process for reacting several kinds of diaryl carbonates in the conversion of the molecular weight. However, the processes disclosed in these patent specifications cannot significantly increase the molecular weight of polycarbonate.

DISCLOSURE OF INVENTION

The present invention have been accomplished by the finding of the inventors that the molecular weight of a polymer is remarkably increased by controlling the number of hydroxyl terminals in the polymer and using a specific salicylic acid compound.

The present invention comprises a process to produce an aromatic polycarbonate having a high molecular weight by treating, in the presence of a transesterification catalyst, an aromatic polycarbonate with an active-hydrogen compound to perform transesterification reaction under a reduced pressure and using a salicylic acid ester derivative having a specific structure as a condensation agent.

This process enables conversion to a polymer having a high molecular weight after remelting, of an aromatic polycarbonate which has been once polymerized and molded into a shaped article. Thus a reclaimed polycarbonate obtained from recovered molded disks, etc. can be recycled to a polycarbonate having high molecular weight. Since the present invention allows for a shortened time necessary for increasing the molecular weight, a polymer having excellent hue can be obtained by this process.

The polycarbonate disclosed in the present invention can be favorably used for applications such as various molded articles, sheets and films, produced by injection molding, blow molding, extrusion molding, injection blow molding, rotational molding, compression molding, etc. When employed in these applications, a polycarbonate obtained by the present invention can be used either singly or as a blend with other polymers. In some applications, various types of processing such as hard coating or lamination may be favorably used.

Examples of the molded articles include optical media such as a compact disk, a digital video disk, a mini-disk and a magneto-optical disk, optical communication media such as an optical fiber, optical parts such as a head lamp lens of an automobile and a lens of a camera, optical instrument parts such as a cover of a siren and light system and an illumination lamp cover, alternatives to window glass panes for vehicles such as an electric car and an automobile, alternatives to home window glass panes, daylighting parts such as a sunroof and a roof of a greenhouse, lenses and casings of goggles, sunglasses and eyeglasses, casings of OA instruments such as a copying machine, a facsimile machine and a personal computer, casings of domestic appliances such as a television set and a microwave oven, electronic parts such as a connector and an IC tray, protection tools such as a helmet, a protector and a protective faceshield, tableware such as a tray, and medical instruments such as an artificial dialysis casing and an artificial denture. The present invention, however, is by no means restricted by the above examples.

The inventors of the present invention have found that an aromatic polycarbonate having a high molecular weight can be produced by treating an aromatic polycarbonate with an active-hydrogen compound in the presence of a transesterification catalyst, to perform transesterification reaction under a reduced pressure followed by reaction with a salicylic acid ester derivative expressed by the following formula (1)

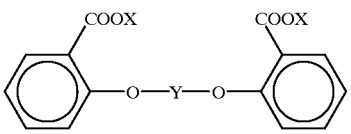

{wherein X is a methyl group or an ethyl group and Y is a carbonyl group or a divalent functional group expressed by the following formula (2),

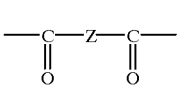

(where Z is an alkylene group having a carbon number of 1 to 30, an arylene group having a carbon number of 6 to 30 or an aralkylene group having a carbon number of 7 to 30)}. In the present invention, the aromatic polycarbonate prior to the reaction refers to a polymer expressed by the following formula (3)

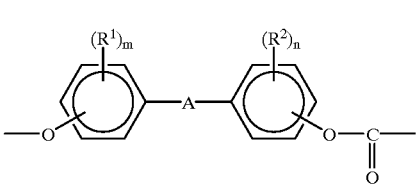

-continued

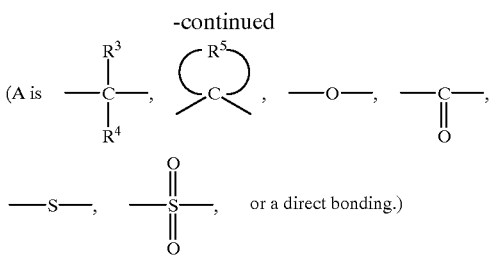

(A is ..., ..., —O—, ..., —S—, ..., or a direct bonding.)

In the formula, the groups $R^1$ and $R^2$ are, each same or different, a hydrogen atom, a halogen atom or a hydrocarbon group having a carbon number of 1 to 12. The hydrocarbon group is preferably an aliphatic hydrocarbon group having a carbon number of 1 to 12 or an aromatic hydrocarbon group having a carbon number of 6 to 12. The halogen atom is preferably chlorine, bromine, iodine, etc.

In the formula, m and n are, each same or different, a number selected from 0 and integers from 1 to 4.

For the A in the above formula (3), the groups $R^3$ and $R^4$ are, same or different, a halogen atom or a monovalent hydrocarbon group having a carbon number of 1 to 12. As the hydrocarbon group enumerated are aliphatic hydrocarbon groups having a carbon number of 1 to 12 and aromatic hydrocarbon groups having a carbon number of from 6 to 12. Examples of the halogen atom are chlorine, bromine and iodine.

The group $R^5$ is an alkylene group having a carbon number of 3 to 8, such as pentylene group or hexylene group.

A polymer prior to the reaction in the present invention may be synthesized by the interfacial polymerization method, melt method, solid-phase polymerization method or thin-film polymerization method. A reclaimed polymer can also be used as the polymer prior to the reaction provided that the polymer falls within the scope of the present invention. These polycarbonates may be mixed with each other for use as the polymer prior to the reaction. For example, a polymer polymerized by the interfacial method may be mixed with a polymer polymerized by the melt method, or a polymer polymerized by the melt method may be mixed with a polymer obtained through recovery of molded disks.

The intrinsic viscosity (η) of the polycarbonate is preferably in the range of 0.2 to 0.6, more preferably 0.25 to 0.50. The intrinsic viscosity (η) of the polymer can be determined by measuring the viscosity in methylene chloride at 20° C. using a Ubbellohde viscometer.

The aromatic polycarbonate used in the present invention refers to a polycondensate having a reaction product of an aromatic dihydroxy compound with a carbonate-bond forming compound as the main recurring unit. The aromatic dihydroxy compound is preferably a compound expressed by the following general formula (4)

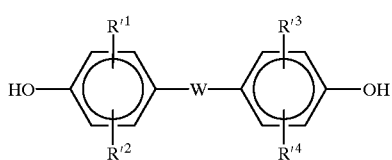

(4)

(wherein $R'^1$, $R'^2$, $R'^3$ and $R'^4$ are each a hydrogen atom, or an alkyl group, an aralkyl group or an aryl group each having a carbon number of 1 to 10; and W is an alkylidene group, an alkylene group, a cycloalkylidene group, a cycloalkylene group or a phenyl-substituted alkylene group having a carbon number of 1 to 30, oxygen atom, sulfur atom, sulfoxide group, sulfone group or direct bonding).

Examples of the aromatic dihydroxy compound are bis ((4-hydroxyaryl)alkanes such as bis(4-hydroxyphenyl) methane, 2,2-bis(4-hydroxyphenyl)propane, 1,1-bis(4-hydroxyphenyl)ethane, 2,2-bis(4-hydroxy-3-methylphenyl) propane, 2,2-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl) phenylmethane, 4,4'-dihydroxyphenyl-1,1'-m-diisopropylbenzene, and 4,4'-dihydroxyphenyl-9,9-fluorene, bis(hydroxyaryl)cycloalkanes such as 1,1-bis(4-hydroxyphenyl)cyclopentane, 1,1-bis(4-hydroxyphenyl) cyclohexane, 1-methyl-1-(4-hydroxyphenyl)-4-(dimethyl-4-hydroxyphenyl)methyl-cyclohexane, 4-(1-(3-(4-hydroxyphenyl)- 4-methylcyclohexyl)-1-methylethyl)-phenol, 4,4'-(1-methyl-4-(1-methylethyl)-1,3-cyclohexanediyl)bisphenol, and 2,2,2',2'-tetrahydro-3,3,3', 3'-tetramethyl-1,1'-spirobis-(1H-indene)-6,6'-diol, dihydroxyaryl ethers such as bis(4-hydroxyphenyl) ether, bis(4-hydroxy-3,5-dichlorophenyl) ether, and 4,4'-dihydroxy-3,3'-dimethylphenyl ether, dihydroxydiaryl sulfides such as 4,4'-dihydroxydiphenyl sulfide and 4,4'-dihydroxy-3,3'-dimethyldiphenyl sulfide, dihydroxydiaryl sulfoxides such as 4,4'-dihydroxydiphenyl sulfoxide and 4,4'-dihydroxy-3,3'-dimethyldiphenyl sulfoxide, dihydroxydiaryl sulfones such as 4,4'-dihydroxydiphenyl sulfone and 4,4'-dihydroxy-3,3'-dimethyldiphenyl sulfone, dihydroxydiarylisatins such as 4,4'-dihydroxydiphenyl-3,3'-isatin, dihydroxydiarylxanthenes such as 3,6-dihydroxy-9,9-dimethylxanthene, dihydroxybenzenes such as resorcinol, 3-methylresorcinol, 3-ethylresorcinol, 3-butylresorcinol, 3-t-butylresorcinol, 3-phenylresorcinol, 3-cumylresorcinol, hydroquinone, 2-methylhydroquinone, 2-ethylhydroquinone, 2-butylhydroquinone, 2-t-butylhydroquinone, 2-phenylhydroquinone and 2-cumylhydroquinone, and dihydroxydiphenyls such as 4,4'-dihydroxydiphenyl and 3,3'-dichloro-4,4'-dihydroxydiphenyl.

2,2-Bis(4-hydroxyphenyl)propane is preferable among the above examples from the viewpoints of the stability as a monomer and the easy availability of a low impurity content monomer, etc.

It goes without saying that the aromatic polycarbonate of the present invention may comprise, as required, one or more kinds of various monomers for the purposes of controlling of glass transition temperature, improvement of fluidity, controlling of optical properties such as increasing of refractive index or decreasing of birefringence, etc.

Examples of the monomer are aliphatic dihydroxy compounds such as ethylene glycol, 1,4-butanediol, 1,4-hexanedimethanol, 2,2-dimethyl-1,3-propanediol (neopentyl glycol), 1,10-decanediol, diethylene glycol, tetraethylene glycol, polyethylene glycol, and polytetramethylene glycol, dicarboxylic acids such as succinic acid, isophthalic acid, 2,6-naphthalenedicarboxylic acid, adipic acid, cyclohexanedicarboxylic acid, and terephthalic acid, or hydroxy acids such as p-hydroxybenzoic acid, 6-hydroxy-2-naphthoic acid and lactic acid.

Carbonate-bond forming compounds to be used in the interfacial polymerization are, for example, a carbonyl halide such as phosgene and a haloformate compound.

Carbonate-bond forming compounds to be used in the melt-polymerization method are an aromatic carbonate, specifically, diphenyl carbonate, ditolyl carbonate, bis(2- chlorophenyl) carbonate, m-cresyl carbonate, dinaphthyl carbonate and bis(4-phenylphenyl) carbonate.

It also goes without saying that other carbonate-bond forming compounds such as dimethyl carbonate, diethyl carbonate, dibutyl carbonate and dicyclohexyl carbonate may be used if desired.

Diphenyl carbonate is preferable among the above examples owing to the reactivity, stability against discoloration of the resin obtained as well as the low cost.

A polyester carbonate also can be produced by using a dicarboxylic acid derivative such as a dicarboxylic acid, a dicarbonyl halide and a dicarboxylic acid ester together with phosgene or a carbonic acid diester in the above process for the production of polycarbonate.

Examples of such dicarboxylic acids or dicarboxylic acid derivatives are aromatic dicarboxylic acids such as terephthalic acid, isophthalic acid, terephthaloyl chloride, isophthaloyl chloride, diphenyl terephthalate and diphenyl isophthalate, aliphatic dicarboxylic acids such as succinic acid, glutaric acid, adipic acid, suberic acid, azelaic acid, sebacic acid, decanedicarboxylic acid, dodecanedicarboxylic acid, adipoyl chloride, suberoyl chloride, azelaoyl chloride, sebacoyl chloride, diphenyl azelate, diphenyl sebacate, decanedicarboxylic acid diphenyl ester, and dodecanedicarboxylic acid diphenyl ester, and alicyclic dicarboxylic acids such as cyclopropanedicarboxylic acid, 1,2-cyclobutanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, cyclopropanedicarbonyl chloride, 1,2-cyclobutanedicarbonyl chloride, 1,3-cyclobutanedicarbonyl chloride, 1,2-cyclopentanedicarbonyl chloride, 1,3-cyclopentanedicarbonyl chloride, 1,2-cyclohexanedicarbonyl chloride, 1,3-cyclohexanedicarbonyl chloride, 1,4-cyclohexanedicarbonyl chloride, cyclopropanedicarboxylic acid diphenyl ester, 1,2-cyclobutanedicarboxylic acid diphenyl ester, 1,3-cyclobutanedicarboxylic acid diphenyl ester, 1,2-cyclopentanedicarboxylic acid diphenyl ester, 1,3-cyclopentanedicarboxylic acid diphenyl ester, 1,2-cyclohexanedicarboxylic acid diphenyl ester, 1,3-cyclohexanedicarboxylic acid diphenyl ester, and 1,4-cyclohexanedicarboxylic acid diphenyl ester.

A polyfunctional compound having three or more functional groups in one molecule may be used in combination with the above dihydroxy compound in the production of a polycarbonate having the recurring unit structure expressed by the above general formula (3). Compounds having phenolic hydroxyl groups or carboxyl groups are preferable as the polyfunctional compound.

Examples of the polyfunctional compound are 1,1,1-tris(4-hydroxyphenyl)ethane, 2,2',2"-tris(4-hydroxyphenyl)diisopropylbenzene, α-methyl-α, α', α"-tris(4-hydroxyphenyl)-1,4-diethylbenzene, α, α', α"-tris(4-hydroxyphenyl)-1,3,5-triisopropylbenzene, fluoroglycine, 4,6-dimethyl-2,4,6-tris(4-hdyroxyphenyl)-heptane-2,1,3,5-tris(4-hydroxyphenyl)benzene, 2,2-bis(4,4-(4,4'-dihydroxyphenyl)cyclohexyl) propane, trimellitic acid, 1,3, 5-benzenetricarboxylic acid, and pyromellitic acid.

Among the above examples, 1,1,1-tris(4-hydroxyphenyl)ethane, α, α', α"-tris(4-hydroxyphenyl)-1,3,5-triisopropylbenzene, etc., are preferable.

When a polyfunctional compound is employed together, the amount of the polyfunctional compound for increasing the melt-viscosity of the polycarbonate is selected from the range of not more than 0.03 mol, preferably 0.00005 to 0.02 mol, more preferably 0.0001 to 0.01 mol, based on 1 mol of the aromatic dihydroxy compound.

The polycarbonate may be, as stated above, synthesized by the interfacial polymerization method or the melt method. A polymer synthesized by the solid-phase polymerization or the thin-film polymerization can also be used favorably. A reclaimed polymer as well as a newly polymerized virgin polymer may be used provided that the polymer falls within the scope of the present invention. These polycarbonates may be used as a mixture. For example, a polymer polymerized by the interfacial method may be mixed with a polymer polymerized by the melt method, or a polymer polymerized by the melt method may be mixed with a polymer recovered from molded disks.

The intrinsic viscosity (η) of the polycarbonate is preferably in the range of 0.2 to 0.6, more preferably 0.25 to 0.50. The intrinsic viscosity (η) of the polymer can be determined by measuring the viscosity in methylene chloride at 20° C. using a Ubbellohde viscometer.

Although there is no particular restriction on the terminal group of the above-mentioned aromatic polycarbonate, the effect of the present invention is especially remarkable for a polymer having a hydroxyl terminal ratio of 50% or less based on the total terminal groups. The ratio of hydroxyl terminal to the total terminal number of the polymer can be determined by the $^1$H-NMR analysis of the polymer. There is no particular restriction on the type of a terminal group having a structure other than that of hydroxyl group. Preferable are terminal groups which will form aromatic monohydroxy compounds.

Examples of the terminals are phenyl terminal, cresyl terminal, o-tolyl terminal, p-tolyl terminal, p-t-butylphenyl terminal, biphenyl terminal, o-methoxycarbonylphenyl terminal and p-cumylphenyl terminal. Among them preferred are terminal groups which form a low boiling point aromatic monohydroxy compound which is easily removable from the system by the hydroxyl terminal increasing treatment described later. Phenyl terminal and p-t-butylphenyl terminal are preferred examples.

According to the present invention, the number of hydroxyl terminals reactable with a salicylic acid ester derivative can be increased by treating the above aromatic polycarbonate with an active-hydrogen compound. Thus, the number of hydroxyl terminals of a polycarbonate can be increased by replacing the aromatic hydroxy compound forming groups which exist in the polycarbonate prior to the reaction, with the active-hydrogen compound. The extent of the increase of the hydroxyl terminal depends upon the desired polymerization degree of an aromatic polycarbonate having high molecular weight.

The addition amount of the active-hydrogen compound to be used in the present invention is preferably from 0.01 to 1.0 mol, more preferably not more than 0.5 mol, especially preferably not more than 0.4 mol based on the total terminal amount of 1 mole of the aromatic polycarbonate prior to the reaction. Addition of an excessive amount of the active-hydrogen compound beyond the above range may cause remarkable decrease in the molecular weight of the polymer. It is to be noted that "the total terminal amount of a polycarbonate" or "the total terminal amount of a polymer" is calculated, for example, by counting the total terminal amount as 1 mole when there is 0.5 mole of a polycarbonate having no branching (or a straight-chain polymer).

The temperature of the above hydroxyl terminal increasing reaction is preferably in the range of 150 to 300° C., more preferably 260 to 290° C., especially preferably 270 to 285° C. The reaction pressure is preferably 100 Torr (13 KPa) or below, more preferably 10 (1.3 KPa) Torr or below and especially preferably 5 to 0.01 Torr (0.67–0.01 KPa).

The active-hydrogen compound to be used in the transesterification reaction is water or a two or more-valent active-hydrogen compound expressed by the following general formula (5).

$$P—(Q)_r \qquad (5)$$

(wherein P is an r-valent hydrocarbon group having a carbon number of 2 to 40, including an alkylene group having a carbon number of 2 to 40, an arylene group having a carbon number of 6 to 40, an aralkylene group having a carbon number of 7 to 40, etc., where the hydrocarbon group may have a straight or branched-chain structure or contain a cyclic structure; Q is a hydroxyl group, a carboxyl group or an amino group; and r is an integer of 2 or more; when r is 3 or more, the resultant polymer contains a branched chain structure, therefore, a two or more valent active-hydrogen compound structure can be selected according to the application of the final objective polymer.)

A specific reaction scheme for increasing the hydroxyl terminal by an active-hydrogen compound is shown in the following diagram where r is 2 and Q is hydroxyl in the above formula (5).

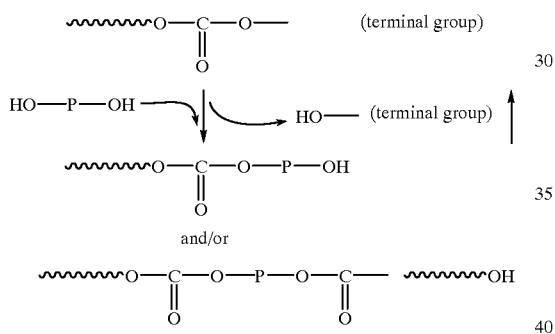

The aromatic monohydroxy compound represented by HO—, (terminal group) in the formula can be removed by proceeding the reaction under a reduced pressure condition. Fluctuation of the molecular weight of polymer can be suppressed and the polymer terminal group can be converted by this process.

When the group Q in the above formula (5) is carboxyl, the reaction with a carbonate bond forms an ester bond generating one molecule of carbon dioxide, and the number of hydroxyl terminals can be increased by the similar reaction mechanism.

Examples of the active-hydrogen compounds are; 1. a compound wherein Q is a hydroxyl group; 2. a compound wherein Q is a carboxyl group; and 3. a compound containing both hydroxyl group and carboxyl group. However, the present invention is not restricted by the examples.

1. Examples of the compound wherein Q is a hydroxyl group are straight-chain aliphatic diols such as ethylene glycol, propylene glycol, 1,4-butanediol, 1,6-hexanediol, 1,10-decanediol, 1,12-dodecanediol, 1,18-octadecanediol, 1,20-eicosanediol and 1,22-docosanediol, straight-chain aliphatic triols such as glycerol, straight-chain aliphatic polyhydric alcohols such as sorbitol, branched-chain aliphatic diols such as neopentyl glycol and a compound of the following formula

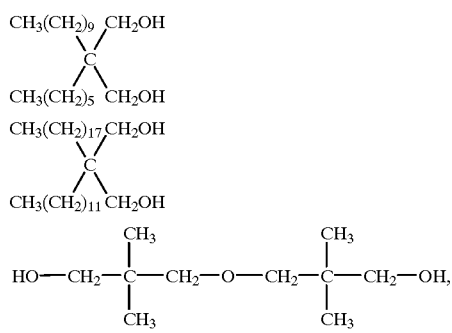

branched-chain polyhydric alcohols such as pentaerythritol, aliphatic diols containing cyclic structure such as 1,6-cyclohexanediol and a compound of the following formula,

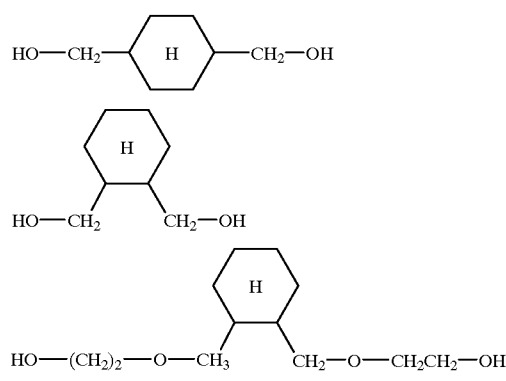

spiroglycols such as a compound of the following formula,

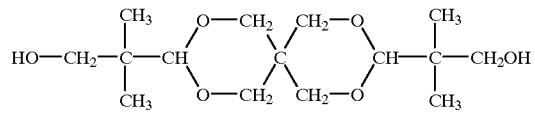

bis(hydroxyaryl)alkanes such as hydroquinone, 1,12-naplithalenediol, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-3B-methylphenyl)propane, and 1,1-bis(4-hydroxy-t-butylphenyl)propane, bis(hydroxyaryl)cycloalkane s such as 1,1-bis(4-hydroxyphenyl)cyclopentane and 1,1-bis(hydroxyphenyl)cyclohexane, dihydroxyaryl ethers such as 4,4'-dihydroxydiphenyl ether, dihydroxyaryl sulfidex such as 4,4'-dihydroxydiphenyl sulfide, dihydroxyaryl sulfoxides such as 4,4'-dihydroxydiphenyl sulfoxide, dihydroxyaryl sulfones such as 4,4'-dihydroxydiphenyl sulfone, and aromatic diols such as 9,9-bis(4-hydroxyphenyl)fluorene.

2. Examples of the compound wherein Q is a carboxyl group are straight-chain aliphatic dicarboxylic acids such as oxalic acid, succinic acid, fumaric acid, adipic acid, 1,10-decanedicarboxylic acid, 1,12-dodecanedicarboxylic acid, 1,18-octadecanedicarboxylic acid, 1,20-eicosanedicarboxylic acid, and 1,22-docosanedicarboxylic acid, straight-chain aliphatic tricarboxylic acids such as 1,2,3-propanetricarboxylic acid, branched aliphatic dicarboxylic acids such as the compound of the following formula,

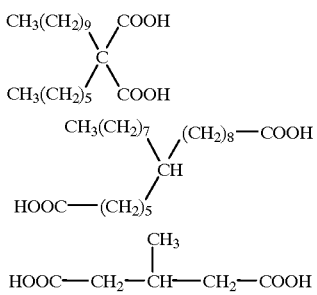

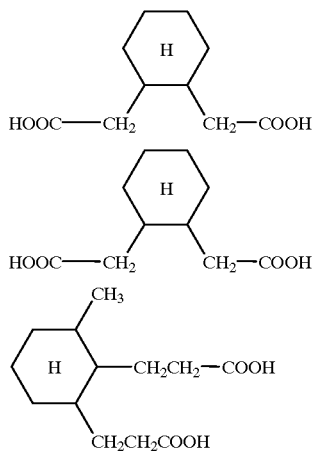

branched polybasic carboxylic acids such as ethylenediaminetetraacetic acid and neopentyl glycol, aliphatic dicarboxylic acids containing cyclic structure such as 1,6-cyclohexanedicarboxylic acid or the compound expressed by the following formula, and aromatic dicarboxylic acids such as terephthalic acid, isophthalic acid and naphthalenedicarboxylic acid.

3. Examples of the compound containing both a hydroxyl group and a carboxyl group are aliphatic hydroxycarboxylic acids such as lactic acid, hydroxybutanoic acid, glycolic acid, citric acid and gluconic acid, and aromatic hydroxycarboxylic acids such as p-hydroxybenzoic acid, salicylic acid and hydroxynaphthoic acid.

Bisphenol A, terephthalic acid and isophthalic acid are most preferable among the above examples.

Conventional transesterification catalysts usually used in the melt method for the production of polycarbonate may be used for the transesterification reaction. Preferable catalysts are alkali or alkaline earth metal compounds and/or nitrogen-containing basic compounds. The alkali or alkaline earth metal compounds used are a hydroxide, an alcoholate or a phenolate of alkali or alkaline earth metal, an alkali or an alkaline earth metal salt of an organic or inorganic acid, and an alkali or an alkaline earth metal salt of an oxo-acid or ate complex of the group 14 element of the periodic table.

Examples of the alkali or alkaline earth metal compounds are sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium nitrate, potassium nitrate, lithium nitrate, sodium nitrite, potassium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, sodium stearate, potassium stearate, lithium stearate, sodium borohydroxide, lithium borohydroxide, potassium borohydride, phenylated sodium boride, sodium benzoate, potassium benzoate, lithium benzoate, disodium hydrogen phosphate, dipotassium hydrogen phosphate, dilithium hydrogen phosphate, disodium salt, dipotassium salt or dilithium salt of bisphenol A, and sodium salt, potassium salt or lithium salt of phenol.

Preferable examples of the alkali metal salt of an oxo-acid of the group 14 element of the periodic table are alkali metal silicate, alkali metal stannate and alkali metal germanate.

The alkali metal silicate is e.g. an acidic or neutral alkali metal salt of monosilicic acid or its condensate, for example, monosodium orthosilicate, disodium orthosilicate, trisodium orthosilicate and tetrasodium orthosilicate.

The alkali metal stannate is e.g. an acidic or neutral alkali metal salt of monostannic acid or its condensate, for example, disodium monostannate ($Na_2SnO_3 \cdot xH_2O$, $x=0$ to 5) and tetrasodium stannate ($Na_4SnO_4$).

The alkali metal germanate is e.g. an acidic or neutral alkali metal salt of monogermanic acid (IV) or its condensate, for example, monolithium orthogermanate ($LiH_3GeO_4$), disodium orthogermanate, tetrasodium orthogermanate, disodium digermanate ($Na_2Ge_2O_5$), disodium tetragermanate ($Na_2Ge_4O_9$), and disodium pentagermanate ($Na_2Ge_5O_{11}$).

The alkali metal salt of an ate complex of a group 14 element of the periodic table is e.g. those described in the specification of Japanese Unexamined Patent Publication 7-268091 made by the inventors of the present invention. Concretely, the examples of germanium (Ge) compounds are $NaGe(OMe)_5$, $NaGe(OEt)_5$, $NaGe(OPr)_5$, $NaGe(OBu)_5$, $NaGe(OPh)_5$, $LiGe(OMe)_5$, $LiGe(OBu)_5$ and $LiGe(OPh)_5$.

Examples of the tin (Sn) compounds are $NaSn(OMe)_3$, $NaSn(OMe)_2(OEt)$, $NaSn(OPr)_3$, $NaSn(O-n-C_6H_{13})_3$, $NaSn(OMe)_5$, $NaSn(OEt)_5$, $NaSn(OBu)_5$, $NaSn(O-n-C_{12}H_{25})_5$, $NaSn(OEt)$, $NaSn(OPh)_5$, and $NaSnBU_2(OMe)_3$.

The above-mentioned transesterification catalyst is used preferably in an amount of $1 \times 10^{-9}$ to $5 \times 10^{-5}$ equivalent of the alkali metal element in the catalyst per 1 mol of the aromatic dihydroxy compound. More preferably, the amount is $1 \times 10^{-8}$ to $1 \times 10^{-5}$ equivalent based on the same basis.

In the reaction of the present invention, at least one kind of cocatalyst selected from the group consisting of oxo-acids of the group 14 elements of the periodic table and oxides of said elements can be used, as necessary, together with the above catalysts.

Exemplary oxo-acids of the group 14 element of the periodic table are silicic acid, stannic acid and germanic acid.

Exemplary oxides of the group 14 elements of the periodic table are silicon dioxides, tin dioxides, germanium dioxides, etc., and their condensates.

The cocatalyst is used preferably in an amount to give not more than 50 mol (atom) of the group 14 metal element of the periodic table existing in the cocatalyst, based on 1 mol (atom) of the alkali metal element in the transesterification catalyst. When the cocatalyst is used in an amount to give the group 14 metal content exceeding 50 mol (atom), the transesterification reaction rate becomes undesirably low.

The cocatalyst is more preferably used in an amount to give between 0.1 to 30 mol (atom) of a group 14 metal element of the periodic table, based on 1 mol (atom) of the alkali metal element of the transesterification catalyst.

Examples of the nitrogen-containing basic compounds are ammonium hydroxides having alkyl, aryl or aralkyl group, etc., such as tetramethylammonium hydroxide (Me$_4$NOH), tetraethylammonium hydroxide (Et$_4$NOH), tetrabutylammonium hydroxide (Bu$_4$NOH), benzyltrimethylammonium hydroxide (Å-CH$_2$(Me)$_3$NOH), and hexadecyltrimethylammonium hydroxide., tertiary amines such as triethylamine, tributylamine, dimethylbenzylamine, and hexadecyldimethylamine, or basic salts such as tetramethylammonium borohydride (Me$_4$NBH$_4$), tetrabutylammonium borohydride (Bu$_4$NBH$_4$), tetrabutylammonium tetraphenyl borate (Bu$_4$NBPh$_4$), and tetramethylammonium tetraphenyl borate (Me$_4$NBPh$_4$).

Me$_4$NOH is preferable among the above examples. The amount is preferably selected to give an ammonium nitrogen atom content in the nitrogen-containing basic compound of $1\times10^{-7}$ to $1\times10^{-2}$ equivalent, more preferably $1\times10^{-5}$ to $1\times10^{-3}$ equivalent, especially preferably $5\times10^{-5}$ to $5\times10^{-4}$ equivalent, based on 1 mol of the constituent unit of the polycarbonate. These nitrogen-containing basic compound catalysts may be used singly or in combination.

The above catalysts may be used singly or in combination. There is no particular restriction on the timing, apparatus and method for the addition of the catalyst. A specific salicylic acid ester derivative compound to be used for increasing the molecular weight of a polymer in the present invention is expressed by the following formula (1)

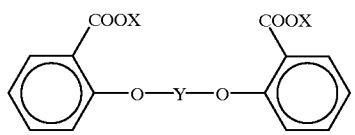

(1)

{wherein X is methyl or ethyl; and Y is a carbonyl group or a divalent functional group expressed by the following formula (2),

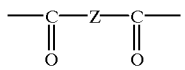

(2)

(where the formula Z is an alkylene group having a carbon number of 1 to 30, an arylene group having a carbon number of 6 to 30 or an aralkylene group having a carbon number of 7 to 30)}.

The alkylene group having a carbon number of 1 to 30 may have a straight-chain, branched-chain or cyclic structure or contain an unsaturated group. Examples of the alkylene group are straight-chain alkylene groups such as a methylene group, an ethylene group, an n-propylene group, an n-butylene group, an n-pentylene group, an n-hexylene group, an n-octylene group, an n-nonylene group, an n-laurylene group, and an n-stearylene group, branched-chain alkylene groups such as an isopropylene group, unsaturated alkylene groups such as a butenylene group, a pentenylene group, a hexenylene group and a dodecenylene group, and cyclic alkylene groups such as a cyclohexylene group.

The arylene groups having a carbon number of 6 to 30 are, for example, a dimethylphenylene group, a propylnaphthylene group, a group having the structure of the formula —CH$_2$—Ph—CH$_2$— or a group having the structure of the formula —Ph—C(CH$_2$)$_2$—Ph—.

There is no particular restriction on the substitution position of the arylene group. For example, in the case of phenylene group, two substituents may take ortho-, meta- or para-positions to each other.

The aralkylene groups having a carbon number of 7 to 30 are, e.g. a phenylene group, a naphthylene group, an anthranylene group, a biphenylene group, etc.

Examples of the salicylic acid ester derivatives are bis(2-methyloxycarbonylphenyl) carbonate, bis(2-methyloxycarbonylphenyl) malonate, bis(2-methyloxycarbonylphenyl) malonate, bis(2-methyloxycarbonylphenyl) terephthalate, bis(2-methyloxycarbonylphenyl) isophthalate, bis(2-ethyloxycarbonylphenyl) terephthalate, bis(2-ethyloxycarbonylphenyl) isophthalate, bis(2-methyloxycarbonylphenyl) succinate, bis(2-ethyloxycarbonylphenyl) adipate, 1,4-butanediol bis(2-ethyloxycarbonylphenyl) carbonate, 1,10-decanediol bis(2-ethyloxycarbonylphenyl) carbonate and bisphenol A bis(2-methoxycarbonylphenyl) carbonate.

The intrinsic viscosity ($\eta$) representing the molecular weight of the polymer is increased through the use of the salicylic acid ester compound by a value of preferably 0.05 or more, more preferably 0.07 or more, further preferably 0.10 or more compared with the intrinsic viscosity ($\eta$) of the aromatic polycarbonate prior to the reaction.

The addition amount of the salicylic acid ester is preferably not more than 1.0 mol, more preferably not more than 0.7 mol, further preferably in the range of 0.5 to 0.01 mol, based on the total terminal amount of 1 mole of the aromatic polycarbonate prior to the reaction.

Low contents of chlorine, nitrogen, alkali metals and heavy metals existing as impurities in the salicylic acid ester derivative are preferable. Herein, alkali metals refer to sodium, potassium, their salts or derivatives and heavy metals, specifically, iron, nickel or chromium.

The contents of such impurities are preferably 1,000 ppm or less for chlorine, 100 ppm or less for nitrogen and 10 ppm or less for alkali metal. Among the heavy metals, they are, 3 ppm or less for iron, 2 ppm or less for nickel and 1 ppm or less for chromium.

The salicylic acid ester derivatives disclosed in the present invention may be derived from a production process of any type of organic synthesis reaction. Preferable process is coupling of a dicarboxylic acid active species (acid halide, acid anhydride, active ester compound, etc.) with a salicylic acid ester in the presence of a basic compound.

In the present invention, the molecular weight of a polycarbonate can be increased by coupling the hydroxyl terminals of a polycarbonate having an increased hydroxyl group content with each the other, through the aforementioned specific salicylic acid ester derivative. While a salicylic acid ester expressed by the following formula (6)

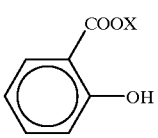

(6)

(wherein the group X is the same as the group in the formula (1)) is formed through the molecular weight increasing reaction, it is preferable to recover the salicylic acid ester to be reused as a raw material for the synthesis of the above terminal sealing agent or polymerization accelerator in order to facilitate cost reduction of the raw material. While the recovered salicylic acid ester may be used as it is for the synthesis of a salicylic acid ester derivative, it is preferably purified before the reutilization.

Any conventional types of apparatuses as well as vessel materials can be used for the molecular weight increasing reaction. A preferable apparatus is one furnished with a horizontal screw having a high stirring efficiency and with a unit capable of reducing the pressure in the apparatus. A more preferable apparatus is a twin-screw extruder having a polymer seal and a venting section. The twin-screw extruder is preferably equipped with a unit process zone composed of a kneading section and a venting section. The number of the unit process zone may be one or more. The kneading section is placed on the upstream side of the venting section relative to the moving direction of the polycarbonate. The kneading section is preferably connected directly to the venting section without interposing a polymer seal section in between.

The materials of the apparatuses are preferably those free from influence on the color of the polymer, for example, stainless steel such as SUS316 and SUS304, nickel and iron nitride. The inner side (the part contacting with the polymer) of the apparatuses may be buffed or plated with chromium, etc.

A catalyst deactivation agent may be applied to a polymer having an increased molecular weight in the present invention. Any agents known as a deactivation agent may be used, however, preferable agents are sulfonic acid derivatives such as a salt, an ester, an anhydride or a betaine of an organic sulfonic acid. An especially preferable agent is a sulfonic acid salt, particularly an organic phosphonium salt or an organic ammonium salt of sulfonic acid.

The catalyst deactivation agents may be applied to a polymer in a molten state after the reaction or to a pelletized polymer to be remelted.

The amount of the catalyst deactivation agents used is 0.5 to 50 mol, preferably 0.5 to 10 mol, more preferably 0.8 to 5 mol based on 1 mol of the aforementioned main polycondensation catalyst selected from an alkali metal compound and an alkaline earth metal compound. The amount corresponds usually to 0.01 to 500 ppm, preferably 0.01 to 300 ppm based on the polycarbonate.

There is no particular restriction on the reactor for the addition of the catalyst deactivation agent to the polymer.

The polymer may be subjected to devolatilizing treatment under a reduced pressure to remove monomers and oligomers in the polymer after the deactivation of the catalyst. The devolatilization is carried out preferably by using a devolatilization assisting agent such as water or an inert gas. There is no particular restriction on the apparatus, temperature, evacuation condition, etc., for the devolatilization.

In the present invention, the polycarbonate produced through the above process may be incorporated with conventional heat-stabilizers, ultraviolet absorbers, mold-releasing agents, colorants, antistatic agents, lubricants, anti-fogging agents, natural oils, synthetic oils, waxes, organic fillers, inorganic fillers, etc.

EXAMPLES

The present invention is described in more detail by the following Examples, which do not restrict the scope of the invention.

The physical properties cited in the present invention were measured by the following methods.

(i) Intrinsic viscosity ($\eta$): the intrinsic viscosity was measured in methylene chloride at 20° C. using a Ubbellohde viscometer.

(ii) Quantitative determination of the amount of the total terminal groups of the polymer (the total terminal number of the polymer): the amount of the total terminal groups was determined by $^1$H-NMR (EX-270 manufactured by JEOL, Ltd.) on a specimen prepared by dissolving 0.02 g of a sample in 0.4 ml of deuterium-substituted chloroform. The amount of the total terminal groups (molar number) of the polymer was expressed by the molar number per 1 ton of the polymer (mol/ton). The hydroxyl terminal concentration (mol %) was calculated through the ratio of each of the terminal structures to the amount of the total terminals of the polymer.

Hydroxyl terminal concentration (mol %)={(the amount of the hydroxyl terminal group (mol))/(the amount of the total terminal groups (mol))}×100

The ratio of a used agent such as an active-hydrogen compound and a salicylic acid ester to the terminal groups of the polymer was calculated by the following formula.

Mol % of used agent={(molar number of an agent)/(the amount of the total terminal groups (mol))}×100

Example 1–2

One hundred (100) grams of pellets of an aromatic polycarbonate prepared from bisphenol A and phosgene by the interfacial polymerization method and having an intrinsic viscosity ($\eta$) of 0.352, a total terminal number of 250 mol/ton and a hydroxyl terminal concentration of 10% (mol%) were charged in a beaker (with a stirrer) having a capacity of 500 ml and made of SUS316, and melted under stirring at a resin temperature of 290° C. under a pressure of 100 Torr (13 KPa). To the resin were added an active-hydrogen compound and a catalyst of the types and amounts shown respectively in Table 1 and the mixture was kneaded under stirring for 20 min at a resin temperature of 290° C. under a pressure of 0.3 Torr (0.04 KYPa). The distillate generated from the reaction system was condensed in a cooling tube and removed from the reaction system. A salicylic acid ester compound shown in Table 1 was mixed with the mixture and the mixture was kneaded at a resin temperature of 290° C. under a pressure of 10 Torr (1.3 KPa) for 1 min and then under 0.3 Torr (0.04 KPa) for 30 min. The distillate generated from the reaction system was condensed in a cooling tube and removed from the reaction system. The obtained aromatic polycarbonate was taken out of the system and subjected to the measurement of ($\eta$))

The physical properties of the obtained polymer are shown in Table 1.

Comparative Example 1

An experiment similar to Example 1 was carried out except that a salicylic acid ester compound was not used.

The physical properties of the obtained aromatic polycarbonate are shown in Table 3.

Example 3–4

Example 1 was repeated except for the use of an aromatic polycarbonate (($\eta$)=0.349, the total terminal number=255 mol/ton and the hydroxyl terminal concentration=40%) prepared from bisphenol A and diphenyl carbonate by the melt-polymerization method and an active-hydrogen compound, a catalyst and a salicylic acid ester compound of the types and amounts shown in Table 2 in stead of those of Example 1.

The physical properties of the obtained aromatic polycarbonate are shown in Table 2.

Comparative Example 2

Example 4 was repeated except that a salicylic acid ester compound was not used.

The physical properties of the obtained aromatic polycarbonate are shown in the following Tables 1 to 3.

TABLE 1

|  | Example 1 | Example 2 |
|---|---|---|
| Active-hydrogen compound | Bisphenol A | Neopentyl glycol |
| amount (mol. %) | 64 | 60 |
| amount (wt. %/polymer) | 3.6 | 1.6 |
| Catalyst: kind | TMAH/BPA2Na | TMAAc/Na$_2$GeO$_3$ |
| amount (μmol/polymer) | 100/4* | 100/5** |
| Salicylic acid ester derivative | 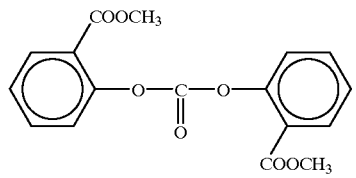 | 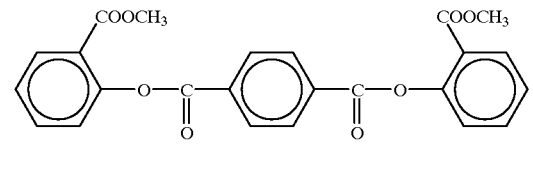 |
| amount (mol. %) | 36 | 37 |
| amount (wt. %/polymer) | 3.0 | 4.0 |
| Intrinsic viscosity (η) after polymerization degree increasing treatment | 0.552 | 0.488 |

TMAH; Tetramethylammonium hydroxide,
BPa2Na; Bisphenol A disodium salt
TMAAc; Tetramethylammonium acetate
*Corresponds to 100/8 (equiv./1 mole of bisphenol A) in terms of equivalent.
**Corresponds to 100/10 (equiv./1 mole of bisphenol A) in terms of equivalent.

TABLE 2

|  | Example 3 | Example 4 |
|---|---|---|
| Active-hydrogen compound | Bisphenol A | Terephthalic acid |
| amount (mol. %) | 35 | 47 |
| amount (wt. %/polymer) | 2.0 | 2.0 |
| Catalyst: kind | BPA2Na | TMAH/BPA2Na |
| amount (μmol/polymer) | 10* | 100/10** |
| Salicylic acid ester derivative | 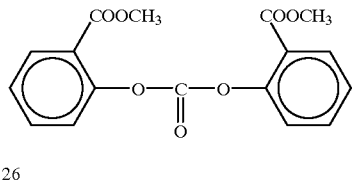 | 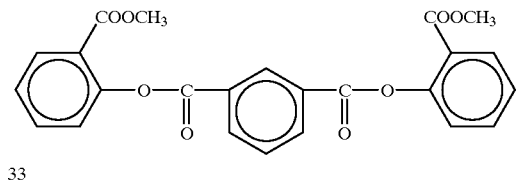 |
| amount (mol. %) | 26 | 33 |
| amount (wt .%/polymer) | 2.2 | 3.7 |
| Intrinsic viscosity (η) after polymerization degree increasing treatment | 0.422 | 0.436 |

*Corresponds to 20 (equiv./1 mole of bisphenol A) in terms of equivalent.
**Corresponds to 100/20 (equiv./1 mole of bisphenol A) in terms of equivalent.

TABLE 3

|  | Comparative Example 1 | Comparative Example 2 |
|---|---|---|
| Active-hydrogen compound | Bisphenol A | Terephthalic acid |
| amount (mol. %) | 64 | 47 |
| amount (wt. %/polymer) | 3.6 | 2.0 |
| Catalyst: kind | TMAH/BPA2Na | TMAH/BPA2Na |
| amount (μ mol/polymer) | 100/4* | 100/10* |
| Salicylic acid ester derivative amount | None | None |
| Intrinsic viscosity (η) after polymerization degree increasing treatment | 0.288 | 0.288 |

*Corresponds to 100/8 (equiv./1 mole of bisphenol A) in terms of equivalent.

**Corresponds to 100/20 (equiv./1 mole of bisphenol A) in terms of equivalent.

What is claimed is:

1. A process for the production of an aromatic polycarbonate characterized in that an aromatic polycarbonate and an active-hydrogen compound are subjected to the transesterification reaction in the presence of a transesterification catalyst under a reduced pressure condition followed by reaction with a salicylic acid ester derivative expressed by the following formula (1)

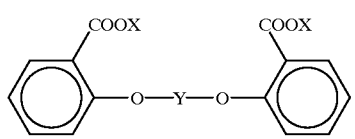

(1)

{wherein X is methyl or ethyl; and Y is carbonyl group or a divalent functional group expressed by the following formula (2),

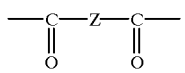

(2)

(wherein Z is an alkylene group having a carbon number of 1 to 30, an arylene group having a carbon number of 6 to 30 or an aralkylene group having a carbon number of 7 to 30)}.

2. A process according to claim 1 characterized in that the intrinsic viscosity (η) of the aromatic polycarbonate after reaction is higher than the intrinsic viscosity (η) of the aromatic polycarbonate prior to the reaction by 0.05 or more when measured in methylene chloride at 20° C.

3. A process according to claims 1 or 2, wherein the addition amount of the active-hydrogen compound is 0.01 to 1.0 mole based on the total terminal amount of 1 mole of the aromatic polycarbonate prior to the reaction (in which the total terminal amount of a polycarbonate is calculated, for example, by counting the total terminal amount as 1 mole when there is 0.5 mole of a polycarbonate having no branching).

4. A process according to claims 1 or 2, wherein the addition molar number of the above salicylic acid ester derivative is 0.01–1.0 mole based on the total terminal amount of 1 mole of the aromatic polycarbonate prior to the reaction (in which the total terminal amount of a polycarbonate is calculated, for example, by counting the total terminal amount as 1 mole when there is 0.5 mole of a polycarbonate having no branching).

5. A process according to claims 1 or 2, wherein the addition amount of the active-hydrogen compound is 0.01 to 1.0 mole based on the total terminal amount of 1 mole of the aromatic polycarbonate prior to the reaction; and wherein the addition molar number of the above salicylic acid ester derivative is 0.01–1.0 mole based on the total terminal amount of 1 mole of the aromatic polycarbonate prior to the reaction (in which the total terminal amount of a polycarbonate is calculated, for example, by counting the total terminal amount as 1 mole when there is 0.5 mole of a polycarbonate having no branching).

* * * * *